Patented July 23, 1929.

1,721,993

UNITED STATES PATENT OFFICE.

WILLIAM D. GREEN, OF BAUER, UTAH, ASSIGNOR TO COMBINED METALS REDUCTION COMPANY, OF BAUER, UTAH, A CORPORATION OF UTAH.

SEPARATION OF MIXED SULPHID ORES BY FLOTATION.

No Drawing.    Application filed July 2, 1925.    Serial No. 41,213.

This invention relates to the separation of mixed sulphids, and particularly lead, silver, zinc and iron sulphid ores by flotation, and more especially to the fractional or differential flotation of certain sulphids from other sulphids.

The object of this invention is to provide an improved method of effecting a differential or preferential or fractional flotation separation of lead sulphids (galena) and silver sulphids (argentite) from zinc and iron sulphids.

I have discovered that if mixed sulphids ores are subjected to froth flotation preferably with a small quantity of an emulsifying agent with agitation and aeration in the presence of an amount of alkaline, or an immunizing sulphite, for example an alkaline earth or metallic sulfite, such as calcium sulfite, sodium sulfite, or zinc sulfite, together with zinc sulfate, equivalent to 0.5 of a pound to 10 pounds, more or less, per ton of ore treated, the ore being in the form of a freely flowing pulp, a differential flotation separation of the lead and silver sulphids from the zinc and iron sulphids can be effected. Free acid solutions are not added to the pulp. If the residues are then subjected to further flotation separation treatment with agitation and aeration with the addition of a "mineral-frothing agent" in the presence of copper sulfate, oil float concentrates relatively rich in zinc can be obtained, the iron remaining in the residues.

The sulfite and zinc sulfate which are used in the first instance for the differential flotation of the lead and silver sulphids may be added to the circuit liquors, or the ores may be submitted to a preliminary digestion with the said sulfite and zinc sulfate in which case said sulfite and zinc sulfate would be used in a preliminary mixing vessel. The residues remaining after the differential separation of the lead and silver sulphids may now be subjected to further treatment with agitation and aeration with the addition of a frothing agent and copper sulfate to the circuit liquors or the residues may be submitted to a preliminary digestion with the copper sulfate in which case the copper sulfate would be used in a preliminary mixing vessel.

Ores taken from the transition zone of ore bodies between the completely oxidized zone and the completely sulphidized zone frequently contain ferrous sulfate and ferric sulfate along with the sulphids and these iron sulfates are ordinarily detrimental to the flotation separation of mixed mineral sulphids. I have discovered that if mixed mineral sulphids containing these soluble iron sulfates are subjected to froth flotation with agitation and aeration with a small quantity of an emulsifying agent in the presence of a sulfite and zinc sulfate the detrimental effect of the iron sulfates is counteracted and a differential or fractional flotation separation of the lead and silver sulphids from the zinc and iron sulphids can be effected. If the residues are then subjected to further flotation separation treatment with agitation and aeration with the addition of a "mineral-frothing agent" in the presence of a sufficient quantity of copper sulfate, oil float concentrates relatively rich in zinc can be obtained, the iron remaining in the residues. The upper-level ores of the Honerine mine operated by the Combined Metals Reduction Company at Bauer, Utah, are of this type and when submitted to froth flotation with agitation and aeration with a "mineral-frothing agent" in the presence of a sulfite and zinc sulfate, a differential or fractional flotation separation of the lead and silver sulphids from the zinc and iron sulphids can be effected.

The following is an example of the application of this invention to the lead and zinc sections feed of the mill of the Combined Metals Reduction Company at Bauer, Utah, assaying lead 7.7%, zinc 16.2%, iron 14.4%. It will be understood that I do not confine myself to these conditions. The ore was subjected to flotation separation with agitation and aeration with a mixture of pine oil and hard wood creosote (50% of each) as the separating medium in the presence of sodium sulfite equivalent to 1.8 pounds per ton of ore treated and zinc sulfate equivalent to .5 pound per ton of ore treated. A differential float was obtained assaying lead 22.7%, zinc 8.2%, iron 24.6%. The residues were subjected to further flotation separation treatment with agitation and aeration with pine oil as the separating medium in the presence of copper sulfate equivalent to 2.5 pounds per ton of ore treated. A differential float was obtained assaying lead 3.1%, zinc 52.5%, iron 5.4%. The remaining residue assaying lead 3.3%, zinc 2.4%, iron 15.8%. The copper sulfate is used as a differential flotation agent to throw the iron into the residue as well as an agent to enhance the floatability of the zinc sulphids.

In this specification the term "ores" is intended to include concentrates, tailings, slimes, and other products containing mixed metallic sulphids.

What I claim, is:

1. A process for the differential separation of minerals, which consists in subjecting to flotation separation, in the presence of an immunizing sulfite, and zinc sulfate, and in the absence of an added free mineral acid an ore containing mixed minerals, each normally susceptible to flotation separation, and by the influence of said sulfite and zinc sulfate differentially modifying said normal flotation susceptibility of said minerals to form a flotation product relatively high in certain mineral values and a residue relatively high in other mineral values.

2. A selective ore separating process which consists in subjecting to flotation separation a comminuted ore containing mixed sulphids, comprising at least one of the group, lead sulphid and silver sulphid and at least one of the group, zinc sulphid and iron sulphid, while modifying their relative flotation susceptibility by the presence of an immunizing sulfite and zinc sulfate in said ore and in the absence of an added free mineral acid to increase the proportion of lead and silver sulphid respectively in the float and the proportion of zinc and iron sulphid respectively in the residue.

3. A process for the selective separation of sulphid minerals containing sulfate of iron which consists in subjecting to flotation separation a comminuted ore containing mixed sulphids, comprising at least one of the group, lead sulphid and silver sulphid and at least one of the group, zinc sulphid and iron sulphid, while modifying their relative flotation susceptibility by the presence of an immunizing sulfite and zinc sulfate in said ore and in the absence of an added free mineral acid to increase the proportion of lead and silver sulphid respectively in the float and the proportion of zinc and iron sulphid respectively in the residue.

4. A process for the differential flotation of an ore containing mixed sulphids which consists in subjecting said ore to flotation separation in the presence of an immunizing sulfite and zinc sulfate, and in the absence of an added free mineral acid said sulphids being each normally susceptible to flotation separation, and by the influence of said sulfite and zinc sulfate differentially modifying said normal flotation susceptibility of said minerals.

5. A process for the differential flotation of an ore containing mixed sulphids and sulfate of iron which consists in subjecting said ore to flotation separation in the presence of an immunizing sulfite and zinc sulfate, and in the absence of an added free mineral acid said sulphids being each normally susceptible to flotation separation, and by the influence of said sulfite and zinc sulfate differentially modifying said normal flotation susceptibility of said minerals.

In testimony whereof, I affix my signature.

WILLIAM D. GREEN.